Dec. 18, 1934.                H. W. GOODALL                1,984,475
                                  HOSE
                           Filed Feb. 14, 1930

INVENTOR
Howard W. Goodall
BY
Augustus B. Stoughton
ATTORNEY.

WITNESS:

Patented Dec. 18, 1934

1,984,475

UNITED STATES PATENT OFFICE 1,984,475

HOSE

Howard W. Goodall, Aldan, Pa.

Application February 14, 1930, Serial No. 428,285

6 Claims. (Cl. 137—90)

The principal object of the present invention is to provide flexible duck and rubber hose having comparatively few plies in proportion to the pressure which it is capable of withstanding.

By way of illustration and not limitation, I have provided hose of two and one-half inches internal diameter that will withstand pressure of five thousand pounds per square inch or more without breaking and that will have or comprise comparatively few plies of duck and rubber, for example, as few as eight plies.

Generally stated, the invention comprises flexible duck and rubber hose having comparatively few plies in proportion to the pressure which it is capable of withstanding and having upon its outside surface a spiral winding of comparatively short pitch adapted to resist radial pressure and having mounted in the interior of its wall reversely disposed spiral windings of comparatively long pitch spaced from the outside spiral winding and embedded between the plies of the hose and adapted to resist elongation of the hose and to provide flexibility The invention also comprises the improvements to be presently described and finally claimed.

In the following description reference will be made to the accompanying drawing forming part hereof and in which—

Figure 1:
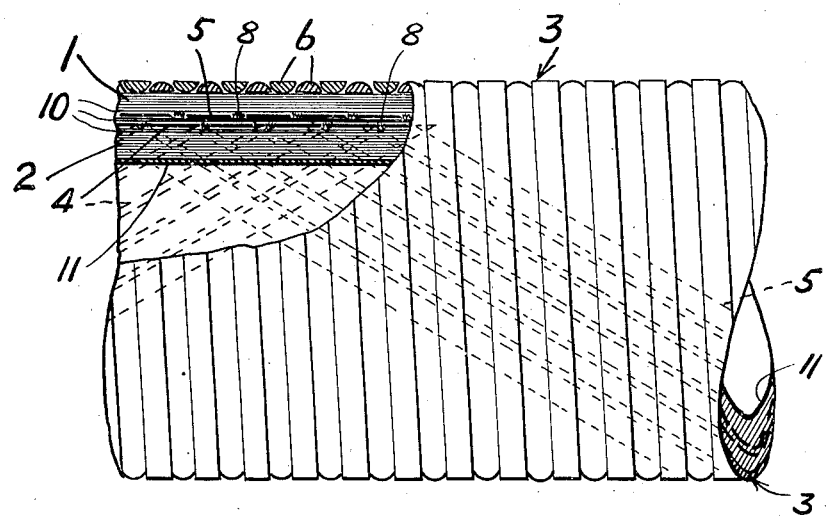
Figure 1 is an elevational view of hose embodying features of the invention with parts broken away and parts illustrated in section.
Figure 2:
Fig. 2 is a view drawn on an enlarged scale and illustrating braided wire ribbon well adapted for use as reversely disposed spiral windings of long pitch embedded in the body of the wall of the hose.
Figure 3:
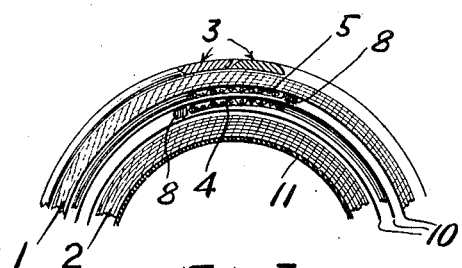
Fig. 3 is a transverse sectional view of a portion of the hose shown in Fig. 1.

In the drawing, 1 and 2 generally indicate plies of duck and rubber. In all cases the number of plies in each group need not be the same but may be different. Upon the outside surface of the hose there is a spiral winding 3 of short pitch. In the interior of the wall of the hose, or, in other words, between the groups of plies 1 and 2 there are arranged reversely disposed spiral windings 4 and 5 of comparatively long pitch. The spiral windings of comparatively long pitch are spaced from the spiral winding of comparatively short pitch. As shown the winding 3 of comparatively short pitch is shown to comprise wires 6, substantially half round in cross section, and oppositely arranged in a manner that is well understood in the art. The spirals 4 and 5 of long pitch are shown to comprise braided wire ribbons 7 but the braided ribbon form is not necessary in all cases. Between the successive turns of the spirals 4 and 5 of long pitch are arranged fillers 8, Fig. 2, which are wound spirally and may consist of rubber or duck and rubber or like material. The purpose of the fillers 8 arranged between the turns of the ribbon 7 is to oppose wear or abrasion of the turns of ribbon against each other when the hose is flexed or bent. When the ribbon 7 is employed, being flat, it does not tend to roll and is well adapted for permanent mounting and connection in the body of the wall of the hose. 10 indicates layers of rubber or rubber material or duck and rubber interposed between and outside and inside of the spiral windings of long pitch.

The purpose of the surface winding 3 of comparatively short pitch is to resist pressure in radial direction, and this by reason of its location on the outside surface of the hose it is well adapted to do. The purpose of the spiral windings 4 and 5 of comparatively long pitch is to resist pressure in a direction endwise of the hose, and this, their arrangement, in the body of the hose and in spaced relation to the winding 3, is well adapted to accomplish. The pitch of the spirals 4 and 5, while comparatively long, is not long enough to interfere with flexibility of the hose. Incidentally it may be said that 11 is the rubber tube or lining at the center of the hose.

The disposition of the spirals of long pitch in the middle portion of the wall of the hose and in spaced relation to the spiral of short pitch on the surface of the hose, as described, prevents and opposes twisting of the hose when pressure is applied. Even if the spirals of long pitch are of ribbon form they can, by reason of the long pitch, be easily and tightly sealed in a coupling.

In practice I may take a commercial article, i. e., a tube and fabric, as 2, and then apply the braid or ribbon as described and then apply one or more plies of duck and rubber 2 and finally apply on the outside the spiral winding of short pitch. I may say that in the application of the spirals of long pitch all of the strands should be substantially alike and put on under substantially the same tension, thus avoiding tendency of the hose to twist.

A test shows that hose of 2½" inside diameter made as described can be bent on a twenty-inch radius and in that position will stand a hydrostatic test of 5000 lbs. to the square inch or more, without blowing out.

From the foregoing description and the attached drawing it is evident that the braided wire ribbons are mesh material.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A hose comprising a body of rubber-like material having embedded therein a plurality of layers of spiral windings of strips of metallic mesh material, each layer comprising a plurality of strips uniformly spaced apart, the strips in certain windings crossing the strips in other windings.

2. A hose comprising a body of rubber-like material and having a plurality of spirally wound layers, said layers being wound in opposite directions whereby the convolutions cross each other and at least one of said layers being formed of metallic mesh material and being embedded in the rubber-like material, each layer comprising a plurality of spirally wound, uniformly spaced, strips of material.

3. A hose comprising a body of rubber-like material having embedded therein a plurality of separated spirally wound layers of metallic mesh material, said layers being wound in opposite directions to cross each other, and each layer having the adjacent convolutions slightly spaced to permit bending of the hose without causing said adjacent convolutions to abut or overlap, each layer comprising a plurality of spirally wound strips of material.

4. A hose comprising a body of rubber-like material having embedded therein a plurality of layers of spiral windings of strips of metallic mesh material, each layer comprising a plurality of strips uniformly spaced apart, the strips in certain windings crossing the strips in other windings, the same number of layers being wound in each direction.

5. A hose comprising a body of rubber-like material and having an even number of spirally wound layers, said layers being wound in opposite directions whereby the convolutions cross each other and at least one of said layers being formed of metallic mesh material and being embedded in the rubber-like material, each layer comprising a plurality of spirally wound, uniformly spaced, strips of material, the same number of layers being wound in each direction.

6. A hose comprising a body of rubber-like material having a plurality of spirally wound layers, said layers being wound in opposite directions whereby the convolutions cross each other and at least one of said layers being formed of metallic braid material including three or more strands each of which is interlaced with each other strand of said braid, said braid being embedded in the rubber-like material, each layer comprising a plurality of spirally wound strips of material.

HOWARD W. GOODALL.